C. Zaiser
Trap

No. 74264

Patented Feb. 11, 1868.

Attest:
John C. Poller
Gustav Berg

Inventor;
Chas Zaiser
fr
Van Santvoord & Hauff
atty

United States Patent Office.

CHARLES ZAISER, OF NEWARK, NEW JERSEY.

*Letters Patent No. 74,264, dated February 11, 1868.*

IMPROVED ANIMAL-TRAP.

*The Schedule referred to in these Letters Patent and making part of the same.*

TO ALL WHOM IT MAY CONCERN:

Be it known that I, CHARLES ZAISER, of Newark, in the county of Essex, in the State of New Jersey, have invented a new and useful Improvement in Animal-Traps; and I do hereby declare that the following is a full, clear, and exact description thereof, which will enable those skilled in the art to make and use the same, reference being had to the accompanying drawing, forming part of this specification, in which drawing—

Similar letters indicate corresponding parts.

Figure 1:
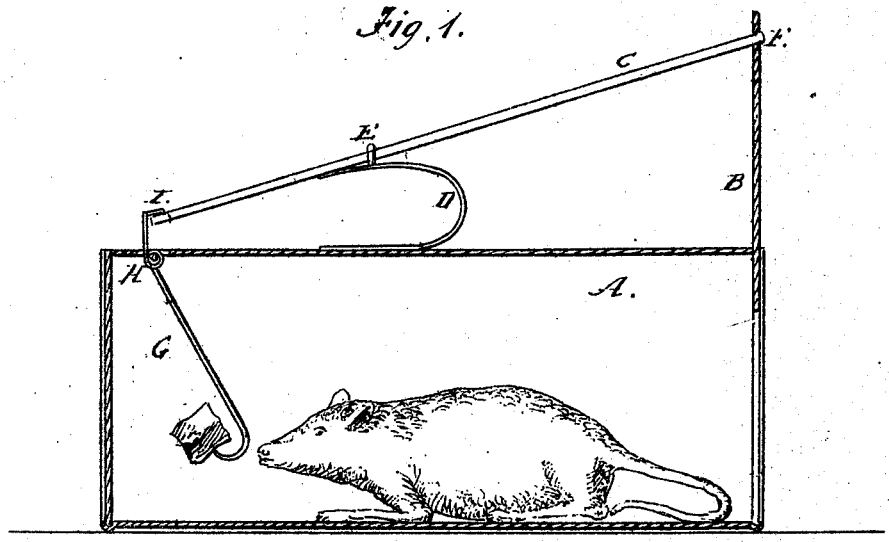
Figure 1 is a vertical longitudinal section of a trap made according to my invention.
Figure 2:
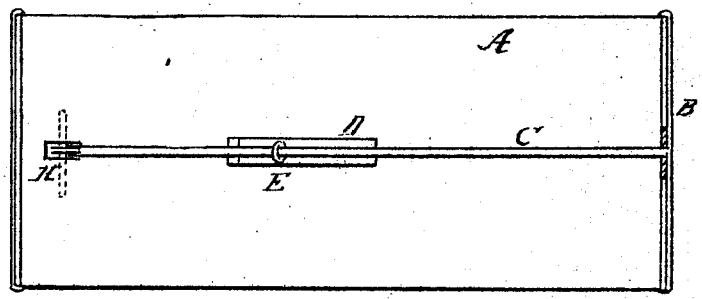
Figure 2 is a plan view.

This invention relates to traps for catching animals, such as rats and mice; and it consists in the use of certain new devices, which render the trap more certain in operation, and more efficient than animal-traps of the ordinary construction.

The letter A designates the body of the trap, which is, in this example, of an oblong shape. Its size is according to the kind of animal to be captured. Both ends of the trap are provided with sliding doors, which open upwards, the door B being the one which is opened for the entrance of the vermin. The other door can be of glass or metal, as preferred. Through the upper part of door B, whose said upper part stands above the level of the top of the trap, I make an opening, F, through which opening I pass the setting-rod or detent C, whose outer end is enlarged to form a head that cannot pass through said opening. The detent C is supported upon a yielding fulcrum, composed, in this example, of a curved spring-plate, D, whose lower end is soldered, or otherwise permanently fastened to the top of the trap, while its upper end is provided with a staple, E, through which the detent C is passed, moving loosely and freely backwards and forwards therein, and being also free to turn therein. The convexity of the spring D is towards the door B, and its concave side is consequently presented towards that end of the trap which has the bait-hook. The letter G designates the bait-hook. Its prong or prongs are turned towards the closed end of the trap, so as to compel the vermin to enter the trap entirely in order to seize the bait, and in order to enable me to reduce the length of the trap as much as possible, by placing the bait as far inward as possible. The upper part of the shank of the bait-hook goes through a slot in the top of the trap, and that part of the shank which is above the body of the trap is bent towards the spring D, into the form of a hook, I, and is flattened, in order to lay hold of and retain by friction the adjacent end of the setting or detent-rod C. The bait-hook is suspended, and vibrates upon a fulcrum, H, arranged on the under side of the top of the trap, as shown in the drawing.

In my improved trap, no opportunity is afforded for the escape of the animal after it has disturbed the bait, because, among other things, the spring-fulcrum is so arranged that it constantly draws the detent or setting-rod C in a direction away from the detaining-hook I, and is, besides, so arranged as to throw the left-hand end of the detent-rod C upwards, and aid it in its necessary movements through the opening F in the sliding door B, whereby the trap is made to work very quickly and easily. The spring-fulcrum D is placed to the left of the middle of the trap, and the staple E is so arranged on the spring as to cause the rod C, when it is locked by hook I, to bear down on the extremity of the spring, whereby it is prevented from slipping through the staple and leaving the hook I until said hook is pulled away from the detent-rod by the disturbance of the bait. When the detent-rod C is free of hook I, its left-hand end is immediately carried upwards by the force of the spring D, and being loose in the staple E, and in the opening F of the door, it is free to slide in them, and conform to the position which the fall of the door will naturally cause it to take.

What I claim as new, and desire to secure by Letters Patent, is—

1. The elastic or yielding fulcrum D, in combination with the setting-rod or detent C, substantially as described.

2. The arrangement of the setting-rod C loosely in the staple E, and also in the hole F of door B, substantially as described.

This specification signed by me, this 19th day of December, 1867.

CH. ZAISER.

Witnesses:
GUSTAV BERG,
W. HAUFF.